(12) United States Patent
Dorairaj et al.

(10) Patent No.: US 11,562,117 B2
(45) Date of Patent: Jan. 24, 2023

(54) SYSTEMS AND METHODS FOR LOGIC CIRCUIT REPLACEMENT WITH CONFIGURABLE CIRCUITS

(71) Applicant: Intel Corporation, Santa Clara, CA (US)

(72) Inventors: Nij Dorairaj, Campbell, CA (US); David Kehlet, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/337,824

(22) Filed: Jun. 3, 2021

(65) Prior Publication Data

US 2021/0294953 A1 Sep. 23, 2021

(51) Int. Cl.
G06F 30/30 (2020.01)
G06F 21/14 (2013.01)
G06F 30/343 (2020.01)
G06F 30/347 (2020.01)
G06F 30/394 (2020.01)
G06F 30/392 (2020.01)
G06F 30/327 (2020.01)

(52) U.S. Cl.
CPC .......... *G06F 30/343* (2020.01); *G06F 21/14* (2013.01); *G06F 30/327* (2020.01); *G06F 30/347* (2020.01); *G06F 30/392* (2020.01); *G06F 30/394* (2020.01)

(58) Field of Classification Search
None
See application file for complete search history.

(56) References Cited

U.S. PATENT DOCUMENTS

| 8,402,401 | B2 | 3/2013 | Chakraborty et al. |
| 10,691,856 | B1 * | 6/2020 | Lysaght ............ G06F 30/392 |
| 2021/0192018 | A1 * | 6/2021 | Bhunia .............. G06F 9/4498 |
| 2022/0198108 | A1 | 6/2022 | Bhunia et al. |

OTHER PUBLICATIONS

J. Zhang, "A Practical Logic Obfuscation Technique for Hardware Security," IEEE Trans. on VLSI Systems, vol. 24, No. 3, Mar. 2016, pp. 1193-1197. (Year: 2016).*
T. Winograd et al. "Hybrid STT-CMOS Designs for Reverse-engineering Prevention," ACM DAC Jun. 5-9, 2016, Austin, TX, 6 pages. (Year: 2016).*

(Continued)

*Primary Examiner* — Leigh M Garbowski
(74) *Attorney, Agent, or Firm* — InventIQ Legal LLP; Steven J. Cahill

(57) ABSTRACT

Methods and systems are provided for protecting a circuit design for an integrated circuit. Logic circuits are identified in at least a portion of the circuit design for replacement. The logic circuits in the circuit design are replaced with a bitstream and configurable circuits that comprise memory circuits. A transformed circuit design is generated for the integrated circuit that comprises the configurable circuits. The configurable circuits in the transformed circuit design perform logic functions of the logic circuits when the bitstream is stored in the memory circuits in the configurable circuits.

20 Claims, 4 Drawing Sheets

(56) References Cited

OTHER PUBLICATIONS

M. Yasin et al., "CamoPerturb: Secure IC Camouflaging for Minterm Protection," ACM ICCAD Nov. 7-10, 2016, Austin, TX, 8 pages. (Year: 2016).*
H.M. Kamali et al., "LUT-Lock: A Novel LUT-based Logic Obfuscation for FPGA Bitstream and ASIC-Hardware Protection," 2018 IEEE Computer Society Annual Symposium on VLSI, pp. 405-410. (Year: 2018).*
V.V. Menon et al., "System-Level Framework for Logic Obfuscation with Quantified Metrics for Evaluation," 2019 IEEE Secure Development (SecDev), IEEE Computer Society, pp. 89-100. (Year: 2019).*
Tamzidul Hoque, et al., "Hardware Obfuscation and Logic Locking: A Tutorial Introduction," IEEE CEDA, IEEE CASS, IEEE SSCS, and TTTC, Date of publication: Mar. 30, 2020; date of current version: Jun. 24, 2020, pp. 59-77.

* cited by examiner

SYSTEMS AND METHODS FOR LOGIC CIRCUIT REPLACEMENT WITH CONFIGURABLE CIRCUITS

FIELD OF THE DISCLOSURE

The present disclosure relates to electronic circuit systems and methods, and more particularly, to systems and methods for replacing logic circuits with configurable circuits in a circuit design.

BACKGROUND

Theft, reverse engineering, and piracy of intellectual property for hardware electronic circuits is a significant issue worldwide. Hence, there is a need to protect designs for electronic circuits before and after manufacture and distribution. However, cryptographic solutions are often not used to protect the design flow of electronic circuits, because some untrusted parties (e.g., in the supply chain) may need access to the details of the designs for electronic circuits. Hardware obfuscation is a method of modifying a design for an electronic circuit to generate an obfuscated design that is substantially difficult to reverse engineer or copy. Traditional protection uses an obfuscator and a key that transforms the original design to the obfuscated design. The functionality of the original design can be determined by applying the correct key to the obfuscated design.

DETAILED DESCRIPTION

As discussed above, hardware obfuscation attempts to protect a design for an electronic integrated circuit (also referred to herein as a circuit design) by modifying the circuit design using a key to generate an obfuscated design that is difficult to reverse engineer without access to the key. However, an untrusted party may obtain unauthorized access to the key that enables the original design to be determined from the obfuscated design. Also, because untrusted parties may have access to an obfuscated design, it is possible that a determined attacker may be able to implement an attack that can discover the functionality of the original design from the obfuscated design without having access to the key.

According to some embodiments disclosed herein, systems and methods are provided for transforming an original circuit design for an electronic integrated circuit into a transformed circuit design for the electronic integrated circuit by replacing logic circuits in the original circuit design with a bitstream and configurable circuits in the electronic integrated circuit that are programmed by the bitstream. The bitstream is not stored in the integrated circuit. Instead, the bitstream is stored in a separate device and provided only to trusted parties. The bitstream may be cryptographically protected. The bitstream is transmitted to the integrated circuit and stored in memory circuits in the configurable circuits during operation of the integrated circuit. When the configurable circuits are programmed by the bitstream, the transformed circuit design can implement the same functions as the original circuit design.

Because the bitstream is not stored in the integrated circuit, an attacker cannot learn the functions of the original circuit design merely by having access to the integrated circuit. Anyone who has the integrated circuit but not the bitstream cannot reconstruct the original circuit design or the functionality of the original circuit design. As an example, a facility that fabricates integrated circuits may have the physical design of an integrated circuit, the netlist of the physical design, and test vectors for the physical design. However, with the logic replacement embodiments disclosed herein, the fabrication facility does not need to have access to the bitstream, because the bitstream is not needed for fabrication or test of the integrated circuit. Without access to the bitstream, individuals at the fabrication facility are not able to reverse engineer the functions of the original circuit design.

Figure 1:
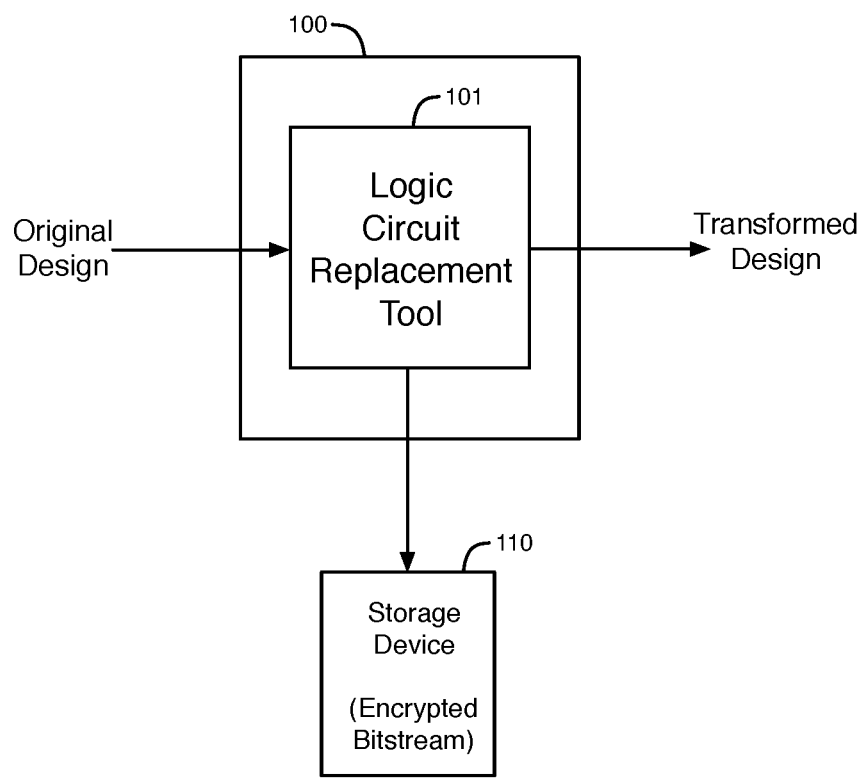
FIG. 1 illustrates an example of an obfuscator system that replaces logic circuits in a design for an integrated circuit with a bitstream of digital bits and configurable circuits in the integrated circuit that are programmed by the bitstream, according to an embodiment.

FIG. 1 illustrates an example of an obfuscator system 100 that replaces logic circuits in a circuit design for an integrated circuit with a bitstream of digital bits and configurable circuits in the integrated circuit that are programmed by the bitstream, according to an embodiment. Obfuscator system 100 includes a logic circuit replacement tool 101. Obfuscator system 100 may, for example, include one or more computer systems. The computer systems in system 100 may include, for example, one or more processor circuits, storage/memory circuits, graphics processing circuits, programmable logic integrated circuits, input/output devices, and busses that connect these components together. Logic circuit replacement tool 101 may include computer hardware components and software tools that are implemented in one or more computer systems in obfuscator system 100. An original circuit design (also referred to herein as an original design) is provided to the obfuscator system 100 as shown in FIG. 1. The original design is a circuit design for at least a portion of (or all of) an electronic integrated circuit. The original design is provided to logic circuit replacement tool 101.

The obfuscator system 100 attempts to hide the intent of the original design by transforming the original design to generate a transformed design for the integrated circuit using logic circuit replacement tool 101. Logic circuit replacement tool 101 transforms the original design by replacing one or more logic circuits in the original design (e.g., critical portions of the original design) with configurable circuits and a bitstream of digital bits. The configurable circuits may include memory circuits and logic circuits. Tool 101 generates a bitstream that can be stored in the memory circuits and used to configure the configurable circuits to cause the configurable circuits to perform the logic functions of the logic circuits replaced in the original design. The configurable circuits perform the same logic functions as the logic circuits replaced in the original design when the bitstream is stored in their memory circuits and used to configure the configurable circuits. The configurable circuits do not perform the logic functions of the logic circuits replaced in the original design without the bitstream stored in their memory circuits.

Thus, logic circuit replacement tool 101 removes one or more logic circuits in the original design and replaces the removed logic circuits with configurable circuits that perform the same logic functions as the removed logic circuits when the bitstream is stored in the memory circuits in the configurable circuits and used to configure the configurable circuits. As examples, the configurable circuits may be lookup-tables (LUTs) that perform combinatorial logic functions or programmable finite state machine circuits that can be configured to perform logic functions. Tool 101 can vary the amount of logic circuits replaced in the original design with configurable circuits and a bitstream based on the complexity of the original design. In some exemplary embodiments, tool 101 may only replace a small fraction (e.g., 10-30%) of the original design with configurable circuits and a bitstream.

The bitstream may be cryptographically protected. The bitstream is provided only to trusted parties to prevent unauthorized access to the original design. The bitstream is initially not stored in the integrated circuit containing the configurable circuits. Instead, the bitstream (e.g., an encrypted version of the bitstream) is transferred to and stored in an external storage device 110, as shown in FIG. 1. Only an authorized party who has access to the bitstream can provide the bitstream from the storage device 110 to the integrated circuit for storage in the memory circuits in the configurable circuits.

A party who has access to the integrated circuit, but not the bitstream, cannot reconstruct the original design. For example, an integrated circuit fabrication facility may have a physical circuit design, a netlist, and test vectors for the circuit design for an integrated circuit. With the embodiment of FIG. 1, the fabrication facility does not have access to the bitstream, because the bitstream is not needed for fabrication or testing of the integrated circuit. Without the bitstream, the original design is not available to a potential attacker at the fabrication facility. According to some embodiments, obfuscator system 100 also includes additional tools that may perform hardware obfuscation on portions of the original design that were not replaced by tool 101 with configurable circuits and a bitstream.

In some embodiments, an additional verification process may be performed after logic circuit replacement tool 101 generates the transformed design to ensure that the function of the original design can be reproduced by applying the bitstream to the transformed design. Obfuscator system 100 also evaluates the techniques performed by tool 101 against various attacks that attempt to reveal the original design from the transformed design. Obfuscation system 100 may evaluate the transformed design with metrics that quantify the effectiveness of the transformation performed by tool 101 to generate the transformed design with respect to various malicious attacks.

During operation, executable software, such as the software of logic circuit replacement tool 101, runs on the processor(s) of obfuscator system 100. Databases may be used to store data for the operation of system 100. In general, software and data may be stored in non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s). Software stored on the non-transitory computer readable storage media may be executed in obfuscator system 100. When the software of obfuscator system 100 is installed, the storage of obfuscator system 100 has instructions and data that cause the computing equipment in obfuscator system 100 to execute various methods (processes). When performing these processes, the computing equipment is configured to implement the functions of obfuscator system 100.

Figure 2:
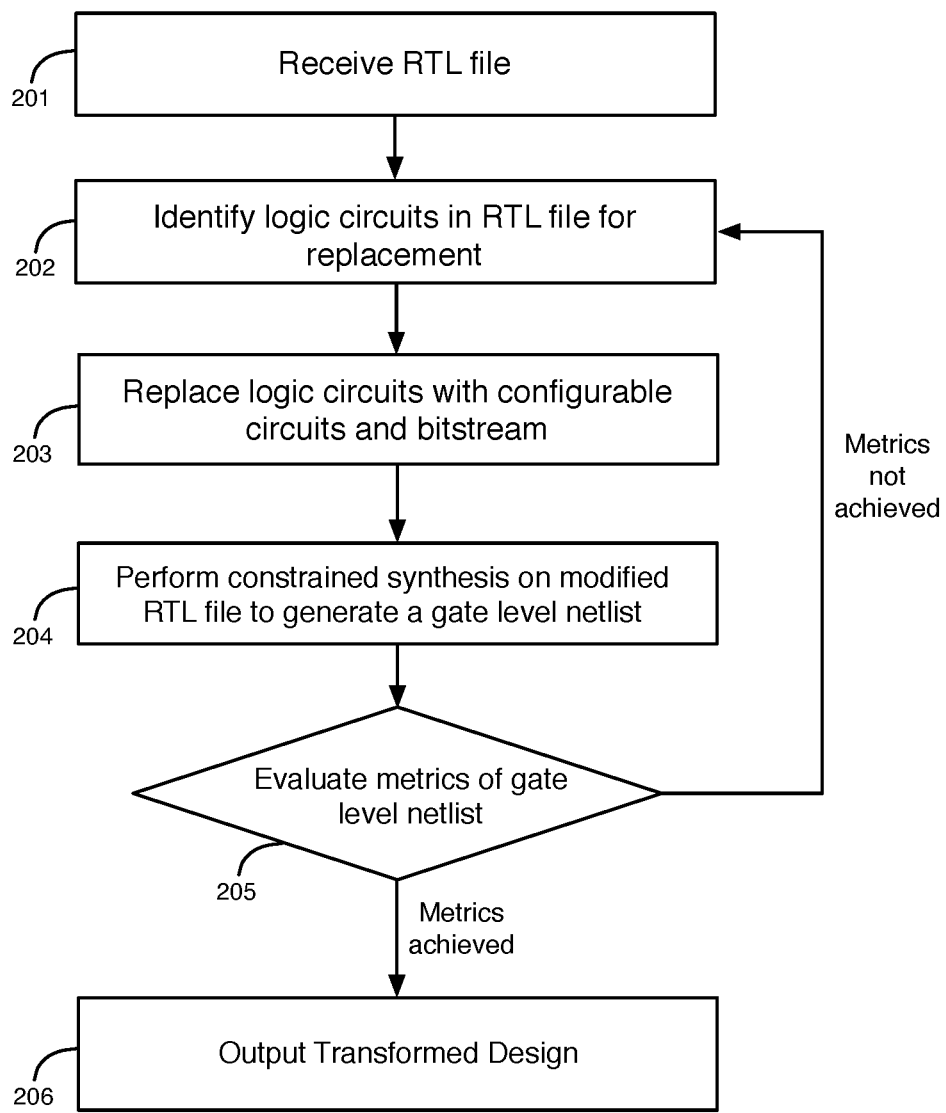
FIG. 2 illustrates examples of operations that may be performed by the logic circuit replacement tool of FIG. 1, according to an embodiment.

FIG. 2 illustrates examples of operations that may be performed by the logic circuit replacement tool 101 of FIG. 1, according to an embodiment. In operation 201, tool 101 receives a register-transfer level (RTL) file for an original design for an integrated circuit. The RTL file may represent the original design in a human-readable form. The integrated circuit may be, for example, an application specific integrated circuit (ASIC), a programmable logic integrated circuit such as a field programmable gate array (FPGA), a microprocessor integrated circuit, or a graphics processing unit. In operation 202, tool 101 identifies one or more logic circuits in the original design that can be replaced with configurable circuits containing memory circuits and a bitstream using the RTL file. In some embodiments, tool 101 may identify thousands or millions of logic circuits in a portion of the original design that can be replaced with configurable circuits containing memory circuits and a bitstream. In some embodiments, tool 101 may identify one or more logic circuits in the original design that have high complexity for replacement. High complexity logic circuits in the original design are more difficult to reverse engineer than low complexity logic circuits. Therefore, replacing high complexity logic circuits in the original design with configurable circuits containing memory circuits and a bitstream may provide increased security against reverse engineering or an attack. In some embodiments, tool 101 may identify one or more combinatorial logic circuits in the original design in operation 202 that can be replaced with lookup-tables and a bitstream that configures the lookup-tables.

In operation 203, logic circuit replacement tool 101 replaces the logic circuits in the original design that were identified in operation 202 with a bitstream and configurable circuits containing memory circuits in the integrated circuit to generate a transformed design. Tool 101 generates a modified RTL file for the transformed design. In operation 203, tool 101 removes the logic circuits that were identified in operation 202 from the original design, replaces the removed logic circuits with configurable circuits in the integrated circuit that contain memory circuits, and generates a bitstream that causes the configurable circuits to perform the same logic functions as the logic circuits removed from the original design when the bitstream is stored in the memory circuits and used to configure the configurable circuits.

As an example, in operation 203, tool 101 may replace one or more combinatorial logic circuits in the original design (e.g., that perform Boolean logic functions) with one or more lookup-table (LUT) circuits in the integrated circuit. The LUT circuits have memory circuits. The LUT circuits perform the same combinatorial logic functions as the combinatorial logic circuits replaced in the original design when the LUT circuits are configured with the bitstream (i.e., the bitstream is stored in the memory circuits in the LUTs).

Figure 3:
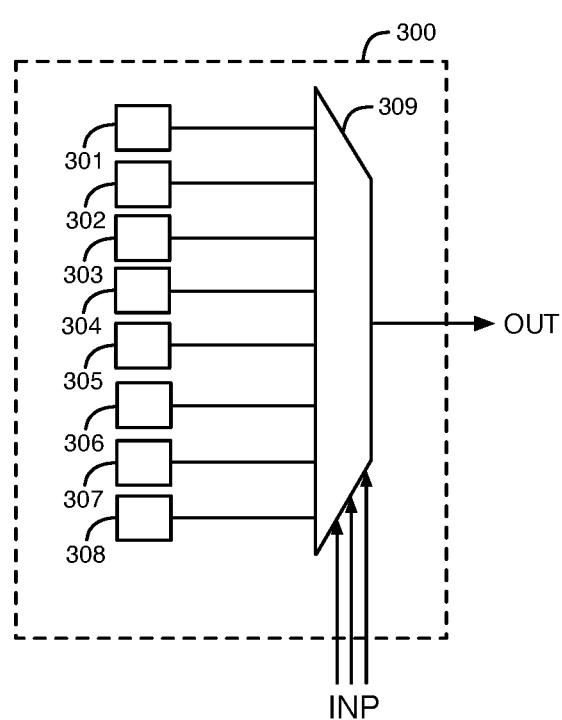
FIG. 3 illustrates an example of a lookup-table (LUT) circuit, according to an embodiment.

FIG. 3 illustrates an example of a lookup-table (LUT) circuit 300, according to an embodiment. LUT circuit 300 is an example of a configurable circuit having memory circuits in the integrated circuit that can be configured with a portion of the bitstream to perform a portion of the original design. LUT circuit 300 of FIG. 3 is a 3-input LUT having 8 memory circuits 301-308 (e.g., random access memory) and a multiplexer circuit 309. In the example of FIG. 3, 8 bits of the bitstream generated by tool 101 are stored in the memory circuits 301-308 prior to the operation of the integrated circuit. One of the bits of the bitstream is stored in each of the memory circuits 301-308. Three input signals INP are provided to 3 select inputs of the multiplexer circuit 309. Input signals INP may be generated by other circuitry in the integrated circuit during operation or may be generated externally. Input signals INP cause the multiplexer circuit 309 to select one or more of the bits stored in memory circuits 301-308 as one or more output signals OUT of multiplexer 309. LUT 300 may be configured by the 8 bits stored in memory circuits 301-308 to perform any one of a number of 3-input combinatorial (e.g., Boolean) logic functions in response to input signals INP.

An another example, in operation 203, tool 101 may replace one or more logic circuits in the original design with one or more programmable finite state machine (PFSM) circuits. The PFSM circuits are configurable circuits that have memory circuits. The PFSM circuits can be configured to perform the same logic functions as the logic circuits replaced in the original design when the PFSM circuits are configured with the bitstream. In some embodiments, the PFSM circuits may be functionally equivalent to lookup-tables.

Referring again to FIG. 2, in operation 204, logic circuit replacement tool 101 performs constrained synthesis on the modified RTL file generated for the transformed design in operation 203 to generate a gate level netlist for the transformed design. Tool 101 may use any synthesis tool to create the gate level netlist for the transformed design using the modified RTL file in operation 204. The constrained synthesis performed in operation 204 may not be a full synthesis of the transformed design. Instead, the constrained synthesis performed in operation 204 may, for example, be a pre-synthesis process that prepares the transformed design to create a netlist according to various metrics applied in operation 205.

In operation 205, logic circuit replacement tool 101 evaluates metrics for the gate level netlist generated for the transformed design in operation 204. The metrics may be selected to ensure that the transformed design conforms to any desired criteria. If tool 101 determines that the gate level netlist generated for the transformed design in operation 204 does not achieve one or more of the metrics in operation 205, then tool 101 performs an additional iteration of operations 202-204 using constraints that are defined by the unachieved metrics to generate a modified gate level netlist. After the additional iteration of operations 202-204 have been performed, logic circuit replacement tool 101 performs operation 205 again to determine if the modified gate level netlist generated in the second iteration of operation 204 satisfies the metrics.

As an example, tool 101 may determine in operation 205 if the gate level netlist of the transformed design exceeds a metric that indicates a maximum additional circuit overhead allowed for the transformed design. As a specific example, the integrated circuit may only have space for a limited amount of additional circuitry (e.g., 5-10%) in the transformed design compared to the original design. If the gate level netlist of the transformed design exceeds the maximum amount of allowed additional circuitry as defined by a metric in operation 205, then tool 101 reduces the amount of additional circuitry in the transformed design during an additional iteration of operations 202-204 to generate a modified transformed design having no more than the maximum amount of allowed additional circuitry as defined by the metric.

As another example, logic circuit replacement tool 101 may perform a security analysis in operation 205 to determine if the bitstream generated in operation 203 can be reverse engineered using known reverse engineering techniques or known attacks. If tool 101 determines in operation 205 that the bitstream generated in operation 203 can be reversed engineered or violates any other security metrics, then tool 101 replaces additional logic circuits in the original design with additional configurable circuits and additional bits in the bitstream during an additional iteration of operations 202-204 to generate a modified transformed design that satisfies the security metrics.

After the metrics evaluated in operation 205 have been achieved, then logic circuit replacement tool 101 outputs the transformed design in operation 206. The transformed design output in operation 206 may, for example, be further obfuscated using other obfuscation tools. The transformed design generated by tool 101 using the operations of FIG. 2 may be used to create the integrated circuit with the configurable circuits containing the memory circuits. As an example, synthesis, placement, and routing may be performed for the integrated circuit using the transformed design generated by tool 101. The bitstream generated in operation 203 is only provided to trusted parties so that the original design for the integrated circuit cannot be accessed by any untrusted parties.

Figure 4:
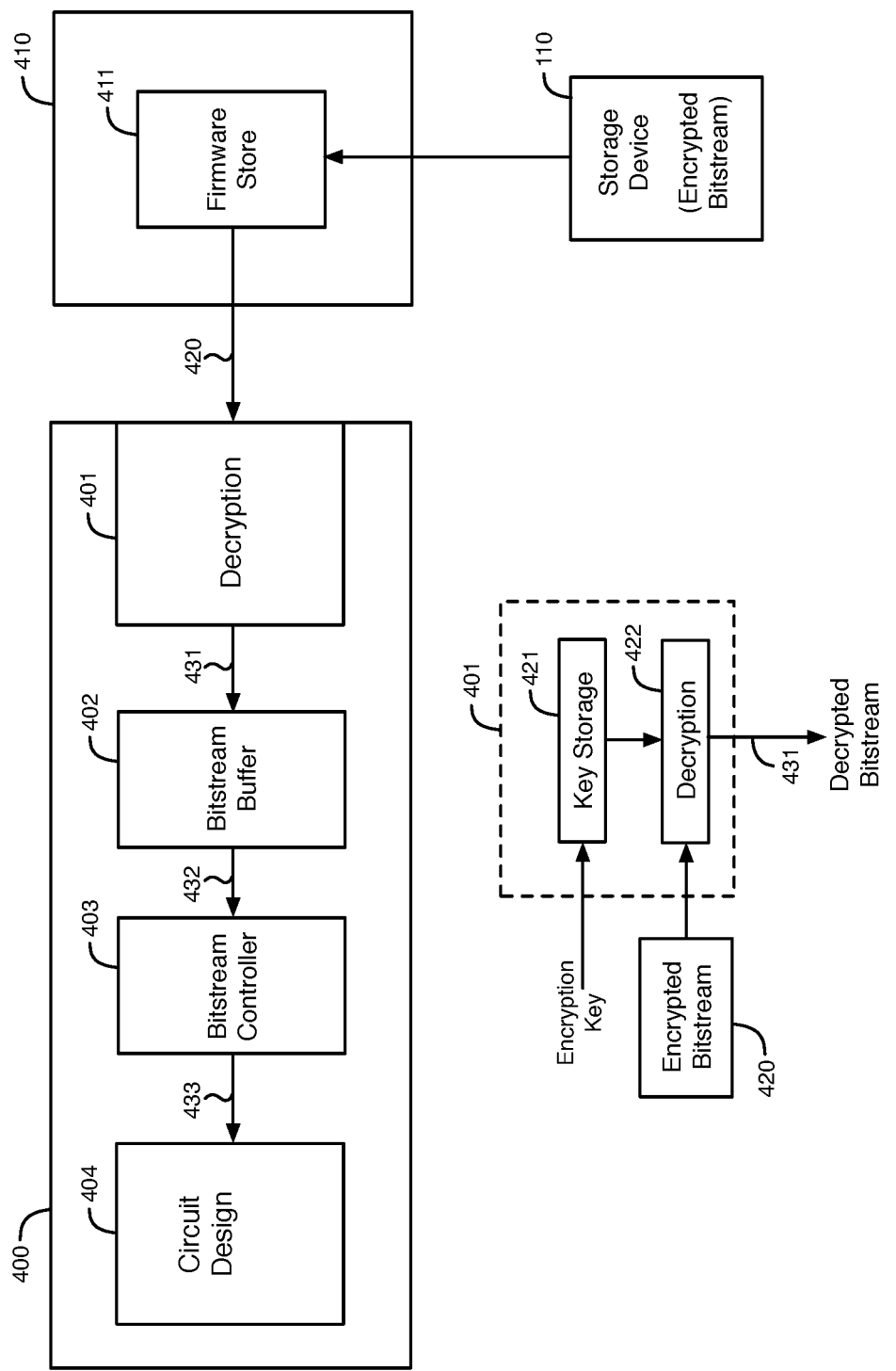
FIG. 4 illustrates a circuit system that includes an integrated circuit having a circuit design that has been protected by the logic circuit replacement tool of FIG. 1, according to an embodiment.

FIG. 4 illustrates a circuit system that includes an integrated circuit having a circuit design that has been protected by the logic circuit replacement tool 101 of FIG. 1, according to an embodiment. The circuit system of FIG. 4 includes an integrated circuit (IC) 400, an integrated circuit (IC) 410, and storage device 110. Integrated circuit 400 includes a decryption engine 401, a bitstream buffer circuit 402, a bitstream controller circuit 403, and a circuit design 404 that has been transformed by logic circuit replacement tool 101 of system 100. The circuit design 404 is implemented in a portion of the IC 400 that includes configurable circuits containing memory circuits. The configurable circuits can be configured by the bitstream generated by tool 101 to perform the logic functions of at least a portion of an original design for IC 400. The configurable circuits may be, for example, LUTs or PFSMs, as discussed above.

In the embodiment of FIG. 4, the bitstream generated by logic circuit replacement tool 101 is encrypted using an encryption key and stored in storage device 110. The storage device 110 containing the encrypted bitstream is only provided to trusted parties that are intended to have access to the original design for circuit design 404 of IC 400. In order to enable IC 400 to operate according to the original design, the encrypted bitstream is initially provided from storage device 110 to firmware store 411 in IC 410, as shown in FIG. 4. Firmware store 411 performs error correction on the encrypted bitstream received from storage device 110 using error correction codes to generate an error corrected encrypted bitstream 420. The error corrected encrypted bitstream 420 is then provided from firmware store 411 to decryption engine 401.

Decryption engine 401 includes key storage circuitry 421 (e.g., non-volatile memory) and decryption tool 422. The encryption key is provided to key storage circuitry 421. Key storage circuitry 421 provides the received encryption key to decryption tool 422. Decryption tool 422 decrypts the encrypted bitstream 420 using the encryption key to generate a decrypted bitstream 431. The decrypted bitstream 431 is provided to bitstream buffer circuit 402. Bitstream buffer circuit 402 buffers the digital bits in the decrypted bitstream 431 to generate a decrypted and buffered bitstream 432.

The decrypted and buffered bitstream 432 is provided to bitstream controller circuit 403. Bitstream controller circuit 403 loads the decrypted and buffered bitstream 432 into the memory circuits in the configurable circuits in circuit design 404 as bitstream 433. After the decrypted and buffered bitstream 433 is loaded into and stored in the memory circuits in the configurable circuits, the configurable circuits are configured by the bitstream 433 to perform the logic functions of the logic circuits replaced by tool 101 in the original design for circuit design 404 of IC 400.

The following examples pertain to further embodiments. Example 1 is a method for protecting a circuit design for an integrated circuit, the method comprising: identifying logic circuits in at least a portion of the circuit design for replacement; replacing the logic circuits in the circuit design with a bitstream and configurable circuits that comprise memory circuits; and generating a transformed circuit design for the integrated circuit that comprises the configurable circuits, wherein the configurable circuits in the transformed circuit design perform logic functions of the logic circuits when the bitstream is stored in the memory circuits in the configurable circuits.

In Example 2, the method of Example 1 may optionally include, wherein the configurable circuits comprise lookup-table circuits.

In Example 3, the method of any one of Examples 1-2 may optionally include, wherein the configurable circuits comprise programmable finite state machine circuits.

In Example 4, the method of any one of Examples 1-3 may optionally include, wherein identifying the logic circuits in at least the portion of the circuit design for replacement further comprises adjusting an amount of the logic circuits identified for replacement in the circuit design based on a complexity of the circuit design.

In Example 5, the method of any one of Examples 1-4 may optionally further include: evaluating a metric for the transformed circuit design to determine if the transformed circuit design satisfies the metric; and replacing additional logic circuits in the transformed circuit design with an additional bitstream and additional configurable circuits that comprise additional memory circuits using a constraint defined by the metric to generate a revised transformed circuit design for the integrated circuit if a determination is made that the transformed circuit design does not achieve the metric.

In Example 6, the method of Example 5 may optionally further include, wherein evaluating the metric for the transformed circuit design to determine if the transformed circuit design satisfies the metric further comprises evaluating whether the transformed circuit design exceeds a maximum amount of additional circuits allowed for the transformed design.

In Example 7, the method of Example 5 may optionally include, wherein evaluating the metric for the transformed circuit design to determine if the transformed circuit design satisfies the metric further comprises determining if the bitstream is able to be reverse engineered using a known reverse engineering technique or known attack.

In Example 8, the method of any one of Examples 1-7 may optionally further comprise: performing synthesis, placement, and routing of the transformed circuit design on the integrated circuit.

In Example 9, the method of any one of Examples 1-8 may optionally further comprise: storing the bitstream in the memory circuits in the integrated circuit to configure the configurable circuits to perform the logic functions of the logic circuits.

Example 10 is a non-transitory computer-readable storage medium comprising instructions stored thereon for causing a computer to execute a method for protecting a circuit design for an integrated circuit, the method comprising: identifying logic circuits that perform logic functions in at least a portion of the circuit design for replacement; and replacing the logic circuits in the circuit design with a bitstream and configurable circuits that perform the logic functions of the logic circuits when the bitstream is stored in memory circuits in the configurable circuits to generate a transformed circuit design for the integrated circuit, wherein the transformed circuit design comprises the configurable circuits.

In Example 11, the non-transitory computer-readable storage medium of Example 10 may optionally include, wherein the configurable circuits comprise lookup-table circuits.

In Example 12, the non-transitory computer-readable storage medium of any one of Examples 10-11 may optionally further include, wherein the configurable circuits comprise programmable finite state machine circuits.

In Example 13, the non-transitory computer-readable storage medium of any one of Examples 10-12 may optionally include, wherein identifying the logic circuits that perform the logic functions in at least the portion of the circuit design for replacement further comprises adjusting an amount of the logic circuits identified for replacement in the circuit design based on a complexity of the circuit design.

In Example 14, the non-transitory computer-readable storage medium of any one of Examples 10-13 may optionally further include: evaluating a metric for the transformed circuit design to determine if the transformed circuit design satisfies the metric; and replacing additional logic circuits in the transformed circuit design with an additional bitstream and additional configurable circuits that comprise additional memory circuits using a constraint defined by the metric to generate a revised transformed circuit design for the integrated circuit if a determination is made that the transformed circuit design does not satisfy the metric.

In Example 15, the non-transitory computer-readable storage medium of Example 14 may optionally further include, wherein evaluating the metric for the transformed circuit design to determine if the transformed circuit design satisfies the metric further comprises evaluating whether the transformed circuit design exceeds a maximum amount of additional circuits allowed for the transformed circuit design.

Example 16 is a computer system configured to protect a circuit design for an integrated circuit, the computer system comprising: a logic circuit replacement tool for identifying logic circuits that perform logic functions for replacement in at least a portion of the circuit design, wherein the logic circuit replacement tool generates a transformed circuit design for the integrated circuit by replacing the logic circuits in the circuit design with a bitstream and configurable circuits that perform the logic functions of the logic circuits when the bitstream is stored in memory circuits in the configurable circuits, wherein the transformed circuit design comprises the configurable circuits.

In Example 17, the computer system of Example 16 may optionally include, wherein the configurable circuits comprise programmable finite state machine circuits.

In Example 18, the computer system of any one of Examples 16-17 may optionally include, wherein the configurable circuits comprise lookup-table circuits.

In Example 19, the computer system of any one of Examples 16-18 may optionally further include, wherein the logic circuit replacement tool adjusts an amount of the logic circuits identified for replacement in the circuit design based on a complexity of the circuit design.

In Example 20, the computer system of any one of Examples 16-19 may optionally further include, wherein the logic circuit replacement tool evaluates a metric for the transformed circuit design to determine if the transformed circuit design satisfies the metric.

The foregoing description of the exemplary embodiments has been presented for the purpose of illustration. The foregoing description is not intended to be exhaustive or to be limiting to the examples disclosed herein. The foregoing is merely illustrative of the principles of this disclosure and various modifications can be made by those skilled in the art. The foregoing embodiments may be implemented individually or in any combination.

What is claimed is:

1. A method for protecting a circuit design for an integrated circuit, the method comprising:
   identifying logic circuits in at least a portion of the circuit design for replacement;
   replacing the logic circuits in the circuit design with configurable circuits that comprise memory circuits in the integrated circuit;
   generating a transformed circuit design for the integrated circuit that comprises the configurable circuits, wherein the configurable circuits in the transformed circuit design perform logic functions of the logic circuits when a bitstream is stored in the memory circuits and configures the configurable circuits;
   evaluating whether the transformed circuit design exceeds a maximum amount of additional circuits allowed for the transformed circuit design; and
   reducing an amount of circuits in the transformed circuit design to generate a modified transformed design having at most the maximum amount of the additional circuits if the transformed circuit design exceeds the maximum amount of the additional circuits.

2. The method of claim 1, wherein the configurable circuits comprise lookup-table circuits.

3. The method of claim 2, wherein each of the lookup-table circuits comprises a multiplexer circuit that selects at least one bit in response to input signals.

4. The method of claim 1, wherein the configurable circuits comprise programmable finite state machine circuits.

5. The method of claim 1, wherein identifying the logic circuits in at least the portion of the circuit design for replacement further comprises adjusting an amount of the logic circuits identified for replacement in the circuit design based on a complexity of the circuit design.

6. The method of claim 1 further comprising:
   evaluating a metric for the transformed circuit design to determine if the transformed circuit design satisfies the metric; and
   replacing additional logic circuits in the transformed circuit design with additional configurable circuits that comprise additional memory circuits using a constraint defined by the metric to generate a revised transformed circuit design for the integrated circuit if a determination is made that the transformed circuit design does not achieve the metric.

7. The method of claim 6, wherein evaluating the metric for the transformed circuit design to determine if the transformed circuit design satisfies the metric further comprises determining if the bitstream is able to be reverse engineered using a known reverse engineering technique or known attack.

8. The method of claim 1 further comprising:
   performing synthesis, placement, and routing of the transformed circuit design on the integrated circuit.

9. The method of claim 1 further comprising:
   storing the bitstream in the memory circuits in the integrated circuit to configure the configurable circuits to perform the logic functions of the logic circuits.

10. A non-transitory computer-readable storage medium comprising instructions stored thereon for causing a computer to execute a method for protecting a circuit design for an integrated circuit, the method comprising:
    identifying logic circuits that perform logic functions in at least a portion of the circuit design for replacement;
    replacing the logic circuits in the circuit design with configurable circuits that perform the logic functions of the logic circuits when a bitstream is stored in memory circuits in the configurable circuits and used to configure the configurable circuits to generate a transformed circuit design for the integrated circuit, wherein the transformed circuit design comprises the configurable circuits;
    evaluating whether the transformed circuit design exceeds a maximum amount of additional circuits allowed for the transformed circuit design; and
    reducing an amount of circuits in the transformed circuit design to generate a modified transformed design having at most the maximum amount of the additional circuits if the transformed circuit design exceeds the maximum amount of the additional circuits.

11. The non-transitory computer-readable storage medium of claim 10, wherein the configurable circuits comprise lookup-table circuits.

12. The non-transitory computer-readable storage medium of claim 10, wherein the configurable circuits comprise programmable finite state machine circuits.

13. The non-transitory computer-readable storage medium of claim 10, wherein identifying the logic circuits that perform the logic functions in at least the portion of the circuit design for replacement further comprises adjusting an amount of the logic circuits identified for replacement in the circuit design based on a complexity of the circuit design.

14. The non-transitory computer-readable storage medium of claim 10, wherein the method further comprises:
    evaluating a metric for the transformed circuit design to determine if the transformed circuit design satisfies the metric; and
    replacing additional logic circuits in the transformed circuit design with additional configurable circuits that comprise additional memory circuits using a constraint defined by the metric to generate a revised transformed circuit design for the integrated circuit if a determination is made that the transformed circuit design does not satisfy the metric.

15. The non-transitory computer-readable storage medium of claim 14, wherein evaluating the metric for the transformed circuit design to determine if the transformed circuit design satisfies the metric further comprises determining if the bitstream is able to be reverse engineered using a known reverse engineering technique or known attack.

16. A computer system configured to protect a circuit design for an integrated circuit, the computer system comprising:
a logic circuit replacement tool for identifying logic circuits that perform logic functions for replacement in at least a portion of the circuit design,
wherein the logic circuit replacement tool generates a transformed circuit design for the integrated circuit by replacing the logic circuits in the circuit design with configurable circuits that perform the logic functions of the logic circuits when a bitstream is stored in memory circuits in the configurable circuits and used to configure the configurable circuits, wherein the transformed circuit design comprises the configurable circuits; and
wherein the logic circuit replacement tool evaluates whether the transformed circuit design exceeds a maximum amount of additional circuits allowed for the transformed circuit design, and reduces an amount of circuits in the transformed circuit design to generate a modified transformed design having at most the maximum amount of the additional circuits if the transformed circuit design exceeds the maximum amount of the additional circuits.

17. The computer system of claim 16, wherein the configurable circuits comprise programmable finite state machine circuits.

18. The computer system of claim 16, wherein the configurable circuits comprise lookup-table circuits.

19. The computer system of claim 16, wherein the logic circuit replacement tool adjusts an amount of the logic circuits identified for replacement in the circuit design based on a complexity of the circuit design.

20. The computer system of claim 16, wherein the logic circuit replacement tool evaluates a metric for the transformed circuit design to determine if the transformed circuit design satisfies the metric.

* * * * *